UNITED STATES PATENT OFFICE.

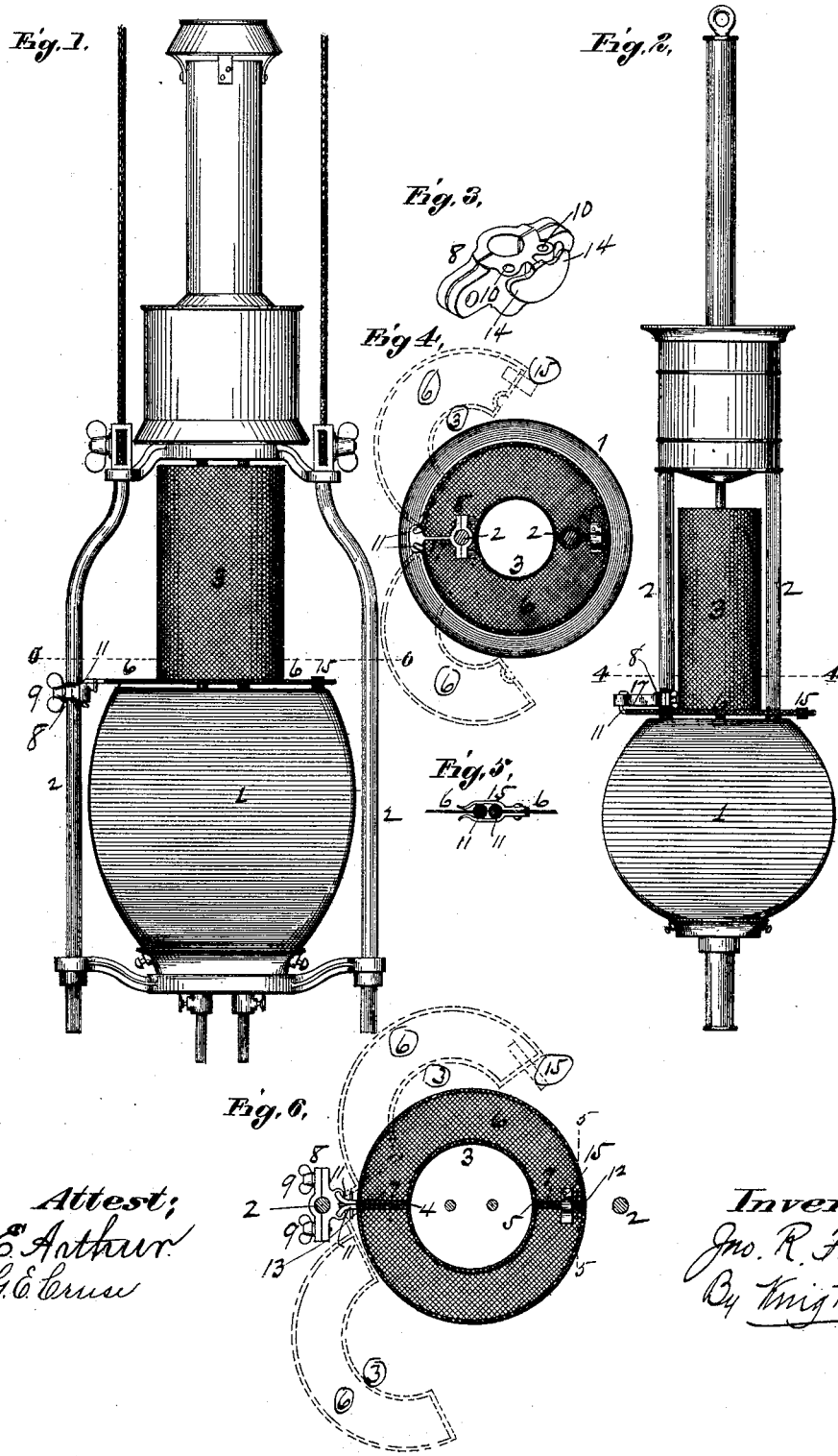

JOHN R. FARMER, OF ST. LOUIS, MISSOURI, ASSIGNOR OF ONE-HALF TO JOHN J. LAHIV, OF SAME PLACE.

SPARK-ARRESTER FOR ELECTRIC LAMPS.

SPECIFICATION forming part of Letters Patent No. 415,628, dated November 19, 1889.

Application filed February 26, 1889. Serial No. 301,242. (No model.)

*To all whom it may concern:*

Be it known that I, JOHN R. FARMER, of the city of St. Louis, in the State of Missouri, have invented a certain new and useful Improvement in Spark-Arresters for Electric Lamps, of which the following is a full, clear, and exact description, reference being had to the accompanying drawings, forming part of this specification, and in which—

Figure I is a side elevation of an electric-arc lamp with my improvement applied. Fig. II is a similar view showing the invention applied to a different form of lamp. Fig. III is an enlarged perspective view of the hinged bracket for use on the form of lamp shown in Fig. I. Fig. IV is a section taken on line 4 4, Fig. II. Fig. V is a detail vertical section taken on line 5 5, Fig. VI, and Fig. VI is a transverse section taken on line 6 6, Fig. I.

My invention relates to an improved spark-arrester for electric-arc lamps; and my invention consists in features of novelty hereinafter fully described, and pointed out in the claims.

Referring to the drawings, 1 represents the ordinary globe of an electric-arc lamp, and 2 the globe-supporting rods. The lamp is made after any well-known form of construction, and my invention does not relate *per se* thereto.

It has been customary to locate spark-arresters consisting of wire-gauze or perforated metal over the globe of the lamp, and my invention relates entirely to the manner of supporting and constructing such an arrester.

3 represents a wire-gauze or perforated metal cylinder forming the arrester. This cylinder is divided vertically from top to bottom, as shown at 4 and 5, Fig. VI, so that it may be opened out, as shown by dotted lines, for convenience in applying the carbons, &c. It has a marginal flange 6 at bottom, which is also formed in two parts, the dividing-lines being shown at 7.

8 represents the supporting-bracket. This is clamped to one of the rods 2 by means of set-screws 9. (See Figs. I and VI.) The bracket itself is best shown in Fig. III.

10 represents perforations made in the bracket to receive the ends of wires 11, which carry the sectional cylinder.

Referring to Fig. VI, the wires preferably pass inward from the bracket to a point indicated at 4, and then pass around in opposite directions to the point 5, and then outward to the point 12, and they may then pass around in opposite directions and meet at 13, or separate wires may be used to support the outer wall of the flange 6. The material of which the cylinder and flange 6 are composed is wrapped around the wires, as illustrated in Fig. VI. The ends of the wires 11 are bent downward to pass through the perforations or openings 10 of the bracket 8.

14 represents wings on the bracket, having concave upper faces, as shown in Fig. III. When the cylinder is closed, the wires 11 fit in the cavities of these wings, which assist in holding the cylinder together. The cylinder is further held together by means of a spring-clamp 15, consisting of the curved arms secured to the flange 6 on one side of the dividing-line 7, and engaging over the wire on the other side, as shown clearly in Fig. V.

When it is desired to open the cylinder 3, the two parts are pulled from each other, when the spring-clamp 15 will be released, and the cylinder may be opened on both sides, as shown in dotted lines in Fig. VI, the wires 11 passing out of the cavities of the wings 14. When the cylinder is closed again, the wires raise slightly and pass into the cavities of the wings, and the catch again engages and holds the parts together.

In Figs. II and IV, I have shown a slight modification, where the rods 2 pass down inside of the globe 1. In this case the bracket is not provided with the wings 14, but has an arm 17, perforated on its outer end to receive the wires 11, which enter the perforations in an upward direction; or they may be riveted at their upper ends.

The advantages existing in my device will be apparent. The structure of the guard renders it durable, light, and cheap. The lower horizontal flange adapts it to different-size globes, and the attachment at one corner of the flange insures the opening out of the way and engagement in the cavities of the wings 14. The formation of the outline-frame of wire makes the peculiar form of catch 15 particularly applicable.

I claim as my invention—

1. In a spark-arrester, the combination of the lamp-frame having a suitable bracket, a sectional guard provided with an outwardly-extending flange, said guard being hinged to the frame at the outer portions of the flange, and the concave wings secured to the frame, in which the lower portions of the guard lodge, as and for the purpose set forth.

2. In a spark-arrester, the combination of the sectional guard constructed on a wire frame, and the perforated bracket, the sections of said guard being hinged to the bracket by passing the ends of the wires through the perforations in the brackets, substantially as set forth.

3. A shade or guard for electric lamps, consisting of the sectional wire frame whose parts are each hinged to a suitable bracket, the housing of suitable material formed on the frame, and the spring-catch consisting of the curved arms carried by one part and engaging over the wire on the other part, substantially as shown.

4. A guard or spark-arrester for electric lamps, consisting of two sections each made of a single wire bent to form the outline of the section, and a housing of perforate material stretched upon said frame, each section being independently hinged by the ends of the wires, which are continued as a means of attachment to the lamp-frame, all substantially as set forth.

5. A spark-arrester or guard for lamps, consisting of a cylindrical upper portion 3 and a lower horizontal flange 6, constructed in two parts, each embracing an outline-frame of wire, the ends of the wire being continued to hinge the parts at the outer corners of the horizontal flange, as shown.

6. In an electric-arc lamp, the combination of the rods 2, the cylinder 3, having a flange 6, bracket 8, having wings 14, and the wires 11, substantially as and for the purpose set forth.

JOHN R. FARMER.

In presence of—
  EDW. S. KNIGHT,
  THOMAS KNIGHT.